United States Patent Office 3,433,104
Patented Mar. 18, 1969

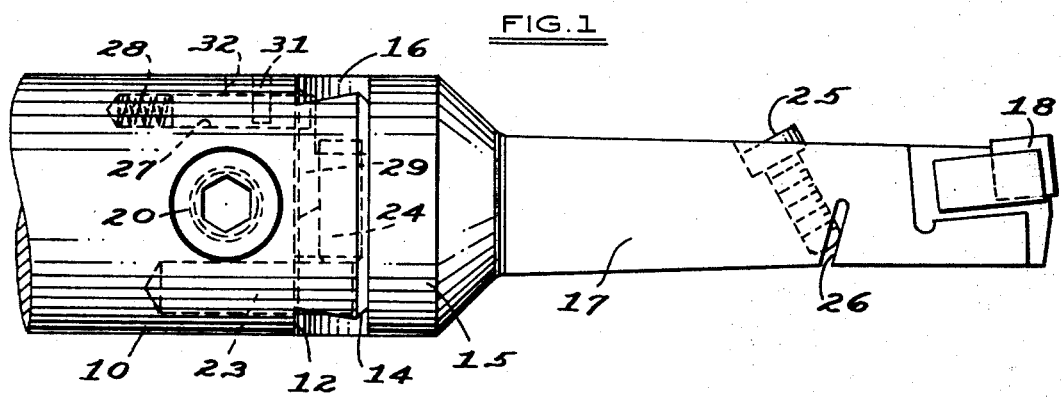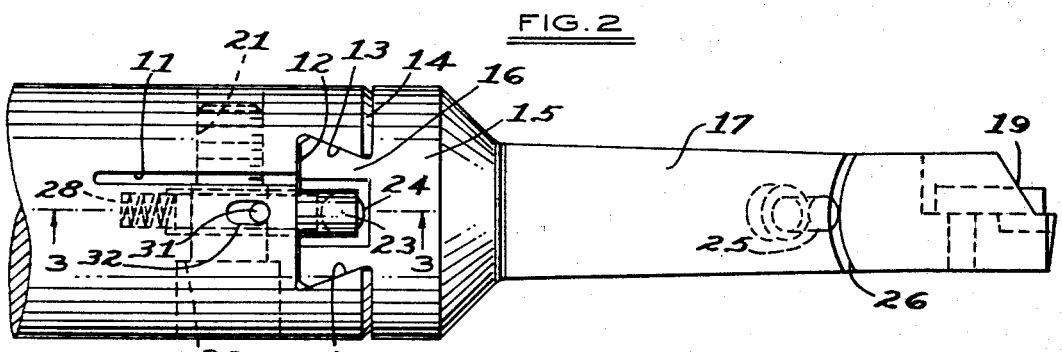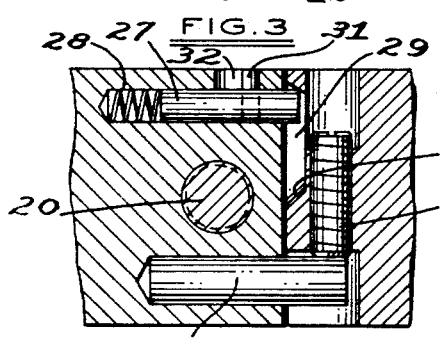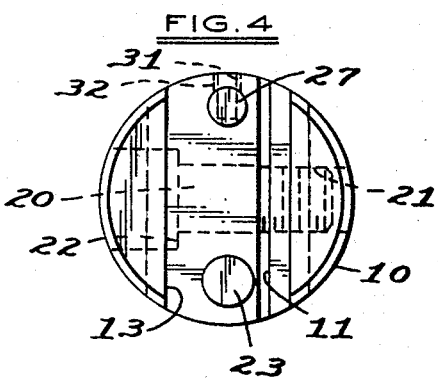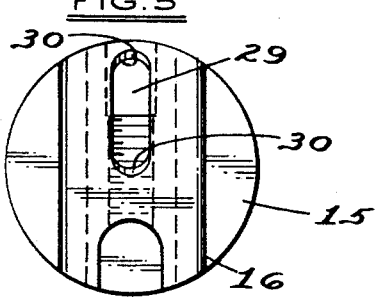
INVENTORS
VICTOR MILEWSKI
WILLIAM YOGUS
BY Farley Forster and Farley
ATTORNEYS

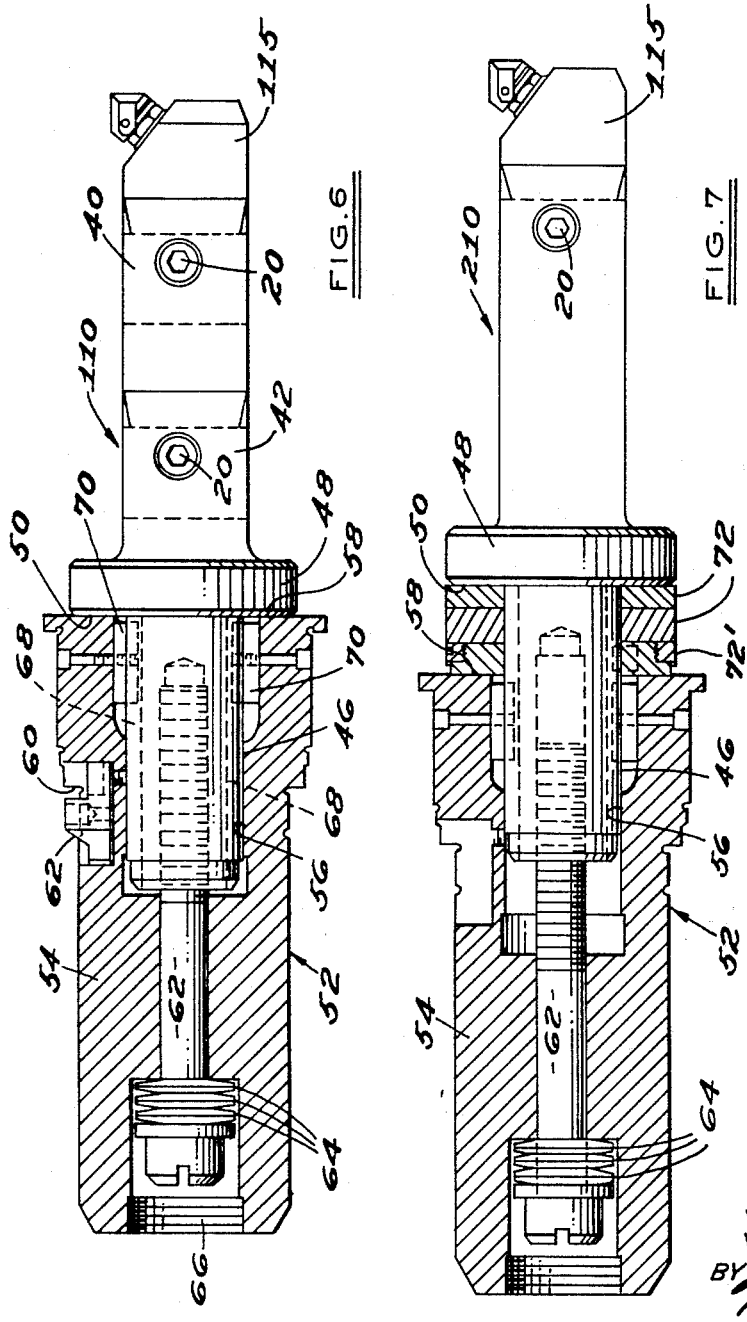

3,433,104
ADJUSTABLE DOVETAIL BORING BAR
Victor Milewski and William Yogus, Birmingham, Mich., assignors to The Valeron Corporation, a corporation of Michigan
Filed Oct. 26, 1966, Ser. No. 589,635
U.S. Cl. 77—58                                    12 Claims
Int. Cl. B23b 29/02, 47/00

ABSTRACT OF THE DISCLOSURE

A tooling system comprising a combination of interchangeable tool shanks, adapters and spacers for axial adjustment providing presettable features, cost saving convertibility of a given tool shank to different machine spindle types and of a given machine spindle to different tool shanks, cylindrical press fit axially preloaded shoulder rigid assembly and in-place final axial adjustment.

---

This invention relates to means for affording axial and radial adjustment for boring and other cutting tools and which is particularly well suited for low cost tooling systems for numerical control machines and the like.

Numerical control machines with automatic tool changing, tool storage and memory systems, all related to tape control, require tooling that can be accurately preset for diameter and length. Present cutting tools for such machines include those having tool shanks which are axially adjustable by threaded means and require precision and expensive measuring equipment. Radial adjustment is usually limited to that afforded the cutting element and tool changes are necessary when maximum adjustments are reached or different cutting tool styles are required.

It is an object of this invention to provide a system of tooling which includes a housing for a tool shank which is axially adjustable in positive increments, and within longer limits than present tooling, and which affords means of radial adjustment beyond that possible with adjustable tool bits and indexable cutting elements. The tooling proposed includes a tool shank which is independently adjustable both axially and radially. It is a true tool shank and does not carry a cutting element of any kind as an integral part but is adapted to receive a variety of tool heads or nose ends thereon as necessary for different work.

The same positive axially and radially adjustable tool shank may be used for a variety of machining operations by simply using different tool heads or nose ends. Rough boring, finish boring, facing, threading, grooving, contour boring, machining bearing races, turning operations, and a vast variety of other machining operations require only the use of relatively inexpensive different cutting tool ends for the basic tool shank.

The versatility and complete interchangeability possible with axial extension and radial adjustments afforded in the tool shank will provide tool cost savings to the user which are not now possible with existing tooling. As will be shown hereinafter, an extremely wide range of diameters and lengths can be provided for, with a variety of cutting styles, with a minimum number of components.

Further objects and advantages will be appreciated in the discussion which follows of the embodiment of this invention shown by the accompanying drawings.

In the drawings:

FIGURE 1 is a side elevational view of the end of a tool shank with a cutting tool head shown engaged thereto and afforded radial adjustment in accord with the teachings of this invention.

FIGURE 2 is a bottom plan view of the tool shank and head shown by the first drawing figure.

FIGURE 3 is a cross-sectional view of the end of the tool shank and the connecting part of the tool head as seen in the plane of line 3—3 in the last mentioned drawing figure.

FIGURE 4 is an end view of the tool shank end which receives the tool head.

FIGURE 5 is an end view of the end of the tool head which is engaged to the tool shank.

FIGURE 6 is a side elevational view of a tool holder adapter with a tool shank engaged thereto that is both radially and axially adjustable and includes a tool head which is also radially adjustable.

FIGURE 7 is similar to the last mentioned figure with a different tool shank and showing another means of affording axial adjustment.

The means of affording radial adjustment in the proposed tooling system is shown in the first five drawing figures. Although related here to the adjustment between a tool shank and tool head, it is applicable elsewhere as will later be appreciated.

The tool shank 10 includes a clevis slot 11 extending lengthwise a short distance from the base 12 of a dovetail slot 13 that is provided in the terminal end 14 thereof. The receptive end of a tool head component 15 is provided with a dovetail part 16 that fits in the slot 13.

In the instance shown, the tool head 15 includes a bar or shank 17 of its own with an indexable cutting insert 18 in an adjustable holder 19 on the end thereof.

The dovetail arrangement enables the tool head 15 to be adjusted radially relative to the tool shank 10 and a socket head bolt 20 in a cross bore through the clevis slotted end of the tool shank affords means for fixing the parts in their radially adjusted positions. Only one end of the bore hole is threaded, as at 21, and the other end is enlarged, as at 22 for recessing the bolt head within the body of the tool shank.

A stop pin 23 is provided in the base of the dovetail slot 13, in the tool shank, and is received within a receptive recess formed in the bottom end of the dovetail part 16 of the tool head. This limits the radial adjustment of the tool head to one direction on the tool shank and which is, of course, that which affords greater radial adjustment outwardly for the cutting insert 18.

A set screw adjustment 24 in the dovetail part 16 enables this radial adjustment to be accurately set and held.

Further radial adjustment of the cutting insert on the tool head shown is also possible by means of the screw 25 and clevis slot 26 arrangement shown.

To assure close fitted and retained engagement of the dovetail part 16 in the dovetail slot 13, during radial adjustment between the two components, a pin 27 backed by a spring 28 and in a bore in the base of the dovetail slot is used. The end of the pin 27 is received in a radial recess 29 in the end face of the dovetail part on the tool head and it also serves as a safety stop.

The end wall 30 of the recess 29 determines the extent of radial adjustment allowed the tool head on the tool shank upon its engagement with the spring loaded pin 27. The pin can be retracted to remove the tool head from the tool shank and for such purpose includes a crosspin 31 in an elongated slot 32 exposed on the side face of the tool shank.

Referring now to FIGURE 6:

A different type of tool head 115 is shown engaged to a tool shank 110. The tool shank in this instance includes an intermediate section 40 which affords an extension and greater length to the shank as well as added means for providing radial adjustment of the tool head on the end of the shank.

The tool shank 110 includes an outer end 42 provided with a dove-tail slot in which is received the dovetail part of the intermediate shank part 40. It, in turn, includes a dovetail slot at its opposite end in which is received the dovetail part of the tool head 115. The inner parts of the dovetail arrangements is as has been described and the socket headed bolts 20 enable the components to be locked in selected radial relation to each other.

All tool shanks used in the proposed tooling system include an inner shank end 46 of a specified length and diameter and with a flange 48 of a greater diameter and which provides a registering annular face or surface 50 on the inner disposed side thereof.

The adapter or housing 52 for the various tool shanks may be of almost any external size or shape required by industry. It may be made as a part of the machine spindle or to include an extended shank 54 that is received in a machine spindle, as shown.

A bore hole 56 is provided in the end of the adapter housing to receive the inner end 46 of the tool shanks. It is ground true and concentric and for an interference fit with the tool shank end it receives; differing in this respect from existing tool shank holders which provide for a clearance fit, particularly where some axial adjustment is available.

The front face 58 of the adapter housing is ground true and square with the bore hold 56 to provide a registering surface for the tool shank flange 48. A second locating shoulder 60 may be provided on the adapter housing itself, as shown in the drawings behind the drive key 62. In such instances the outer dimension of the housing 52 is accurately ground to a precalculated dimension between the end face and shoulder. This is to assure all adapter housings of a common size will have the same dimension in establishing the calculating dimension used to preset the cutting element.

A draw bolt 62 is provided through the inner end of the adapter housing for threaded engagement with the end of the tools shank received in the housing bore 56. The bolt is used to draw the tool shank end 46 into tight press fit engagement within the bore hole (in the order of .0001 inch diametrical clearance to .0001 inch interference) and also to eject it when desired. Spring washers 64 are provided under the bolt head, for purposes later described, and the head end of the bolt hole is threaded, as at 66, to receive a closure plug (not shown).

When the features of this invention are incorporated directly in a machine tool spindle, it is advisable to remove the draw bolt 62 and use a power driven draw bolt to draw in and eject the tool holder shank.

The tool shank end 46, received in the adapter housing bore 56, is provided with key way slots 68 on diametrically opposite sides for engagement with drive keys 70 through which locked rotary drive motion is assured between the housing and tool shank parts.

In FIGURE 7, a longer boring bar type tool shank 210 is shown. The same dovetail radial adjustment for the tool head 115 is provided but a different means for providing axial adjustment is shown.

When it is desired to adjust a tool shank axially, within certain tolerances known for the inner end length of the tool shank, spacers 72 may be used. These are annular members ground to a given dimensional width and formed for close fitted engagement on the inner end of the tool shank. They are received between the inner face 50 of the tool shank flange 48 and the registering front face 58 of the adapter housing.

For any given axial adjustment, the number of spacers 72 that will provide the exact or closest dimensional combination are selected for use. If extremely fine adjustments are necessary, an adjustable spacer 72′ may be used in place of one of the solid spacers. It is accurately manufactured to maintain a 360 degree bearing surface and includes a threaded collar, as shown, for the finer adjustment desired.

When larger axial adjustments are needed than a tool shank can provide, because of the length of its inner end but still within safe limits for the extended length that will be provided its outer end, and intermediate shank part 40, as shown in FIGURE 6, may be used. It will also be obvious that certain combinations of spacers 72 or 72′ may be used with the axial length extending intermediate shank part 40.

The spring washers 64, in combination with the adjustable spacer 72′, enable adjustments of the tool assembly without removal from a tool spindle.

For operations requiring close axial limits, an assembly with or without the solid spacers 72, but including an adjustable spacer 72′ and the spring washers 64, is put together for a definite axial dimension. The draw bolt 62 is drawn tight to preload the spring washers to a predetermined load and the assembly is adjusted for the dimension called for. The tool assembly is then placed in the machine spindle and an initial cut is taken. If further adjustment is required, the axial length can be increased or reduced by means of the adjustable spacer 72′, within the limits afforded by the spring washers and without removing the assembly from the machine spindle.

From the foregoing, the general construction of the tooling system proposed should now be apparent. However, certain features are worth further discussion.

For numerical control machines, a basic number of tool shanks, extensions, spacers, and different cutting heads will provide great versatility without a large and expensive tool inventory. The necessary tooling for a particular job can be set up ahead of time from the components available and preset to necessary axial lengths and radial adjustments. Where fine axial adjustments are expected, the adjustable spacer and spring washer combination is used. Radial adjustments are possible before and in service by means of the adjustment screw 24 in the dovetail connection arrangement as well as by the clevis adjustment arrangement in extended length boring bars, when used. Cutting tool tip adjustments need not normally be used except in the preassembly of component parts.

The tool holding parts 10, 110, 210 and the like, are true tool-shank components in that they do not carry a cutting element of any kind as an integral part thereof. Each is adapted to be positively adjusted and located axially and to receive a variety of tool heads on the end thereof. The interference fit afforded the inner end 46 of the tool holder in the adapter 52 is to avoid any clearances which might cause shifting and wear.

The 360 degree bearing surface provided by the tool holder flange 48, in combination with the interference fit, assures extreme rigidity. It also enables use of a relatively short inner shank end for the tool holder and use of a single bearing diameter surface.

Commonly known tooling of this type, which makes use of a threaded tool shank to provide means for axial adjustment, requires enough of a clearance fit to prevent broaching and damage. This normally means a longer tool shank, with at least two bearing diameters, some means to centralize the inner end of the tool shank, and a locking means for the front end of the threaded shank.

In the arrangement shown and taught by this invention, the tool holder flange 48 extends the area of stress and bending considerably beyond the relatively small tool holder shank diameter used and over a much larger true and squared bearing area.

The dovetail arrangement for radial adjustment of a cutting head on a tool holder or shank part is, of course, completely independent of the axial adjustment afforded the holder or shank itself. The inner end face of the cutting tip head is ground true and square with the end face 14 of the tool holder shank part and the mating dovetail surfaces are likewise closely matched and squared. When the bolts 20 are tightened, the squared end surfaces of the tool holder shank and cutting head are engaged fast and securely. There is no engagement between the end and base of the dovetail parts. This assures a broader bearing surface and centralized holding power for greater rigidity in any position within the predetermined radial range.

Roughing, semifinishing and precision finishing can be all accomplished quickly and easily with minimum downtime by use of the different detachable and radially adjustable cutting heads with a common tool shank. The adjustment screw for setting the radial position, for a given operation with a certain head, serves as a preset stop. This enables the roughing head to be removed and quickly replaced with a preset semi or finishing head part. In finish bores where tolerances are more liberal, roughing heads can be used to perform finish operations.

From the foregoing, the many objects and advantages to be gained in the practice of this invention should now be obvious. Also, certain modifications and variations in the structure specifically shown and described will be appreciated as conceivably within the teachings set forth. Accordingly, this invention is not to be limited in its scope beyond the language of the hereinafter appended claim.

We claim:

1. A tooling system for numerical control machines and other uses, comprising:
   a tool shank providing member having one integral end formed for spindle mounted rotary drive and the other end for receiving interchangeable cutting tool heads in retained engagement therewith;
   a shoulder provided on said tool shank providing member between the ends thereof;
   adapter means for engaging and retaining the drive end of said tool shank providing member in close interference fitted cylindrical concentric drive engagement with suitable rotary drive means and said shoulder in relative engagement with said means for known axial location of the other end thereof;
   and interchangeable means provided on said tool shank providing member between said cutting tool heads and said adapter means for changing the effective axial length of said cutting tool heads relative to said adapter means.

2. The tooling system of claim 1, said interchangeable means including spacer rings of varying width received between said annular flange and said drive means.

3. The tooling system of claim 1, said interchangeable means including extension members provided between the outer disposed end of said tool shank providing member and said cutting tool heads.

4. The tooling system of claim 1, said tool shank providing member having the tool head receptive end thereof formed for dovetail engagement with said cutting tool heads permissive of radial adjustment of said heads relative thereto.

5. The tooling system of claim 2, said drive end engaging and retaining means including spring washers preloaded in assembly and holding said drive end for variable axial adjustment.

6. An axially and radially adjustable tool assembly for use with rotary drive spindle machines, and comprising:
   an adapter housing having an axial bore and shoulder means for axial location of said housing in a rotary drive spindle machine;
   a tool shank member having one integral end formed for close interference fitted cylindrical engagement in said housing bore and including a shoulder for locating engagement with the end of said housing;
   a draw bar provided through the inner end of said adapter housing and into said bore for fitting and retaining engagement with the end of said tool shank member received in said bore;
   interchangeable means received on the inner end of said tool shank member between said shoulder and the end of said housing for axially adjusting the extended length of said tool shank member beyond said adapter housing; and
   a dovetail connection provided on the other extended end of said tool shank member for interchangeable engagement with different cutting tool heads and radial adjustment of said heads relative thereto.

7. The tool assembly of claim 6, the interference fitted end of said tool shank member being of extended length and of a constant bearing diameter and having drive engagement with said adapter in said bore, and said draw bar including spring washer means partially loaded in the fitted engagement of said tool shank member in said bore for the subsequent and final setting of said interchangeable axially adjusting means.

8. The tool assembly of claim 6, including a member for extending the axial length of said tool shank member and received on the outer extended end thereof, such member having opposite ends formed to include dovetail connctions for engagement with said tool shank and for engagement of said cutting tool heads thereto for radial adjustment as before.

9. A tool assembly for rotary drive spindle machines and the like, comprising:
   a tool shank member having a dovetail slot provided in the terminal end thereof and extending diametrically thereacross;
   a clevis slot provided in the base of said dovetail slot and threaded means for the closing thereof and the contraction of said dovetail slot;
   a tool head having a cutting tip provided on the terminal end thereof and a dovetail extension on the other end thereof for fitted engagement in said dovetail slot;
   a fixed stop provided in said dovetail slot near one end thereof, an adjustment screw provided in said dovetail extension lengthwise thereof for engagement with said fixed stop and for presetting the radial disposition of said tool head as initially received on said tool shank member;
   a retractable pin and cooperative limit stop slot provided respectively in said tool shank member and tool head for retaining said tool head on said tool shank member and defining relative limits of radial movement therebetween.

10. The tooling system of claim 1 including a draw bar provided through the inner end of said adapter means and into the drive end of said tool shank providing member for retaining such shoulder in relative engagement with said means.

11. The tooling system as set forth in claim 1 wherein said interchangeable means includes one or more spacer rings between said shoulder and said drive means establishing a rigid bearing between adjacent surfaces of said shoulder and drive means.

12. The tooling system as set forth in claim 1 wherein said interchangeable means includes one or more spacer rings between said shoulder and said drive means establishing a rigid bearing between adjacent surfaces of said shoulder and drive means extending radially to the extremities of said shoulder.

References Cited

UNITED STATES PATENTS

| | | | |
|---|---|---|---|
| 1,225,113 | 5/1917 | Davie | 90—11.2 |
| 2,289,583 | 7/1942 | Malone | 90—11.1 |
| 3,138,997 | 6/1964 | Bruckner | 90—11.1 |
| 3,198,037 | 8/1965 | Yogus. | |
| 3,282,133 | 11/1966 | Dickinson et al. | 77—58.3 |
| 3,308,697 | 3/1967 | Cocco | 82—36 |

GERALD A. DOST, *Primary Examiner.*

U.S. Cl. X.R.

29—96, 103; 82—36; 90—11; 77—3; 340—10